United States Patent [19]

Gumangan et al.

[11] Patent Number: 5,437,312
[45] Date of Patent: Aug. 1, 1995

[54] REINFORCED INSULATION BLANKET

[75] Inventors: Marcelino A. Gumangan, Lenexa; James M. Bleigh, Olathe; Paul M. Dwyer, Bonner Springs, all of Kans.

[73] Assignee: Performance Contracting, Inc., Lenexa, Kans.

[21] Appl. No.: 188,148

[22] Filed: Jan. 27, 1994

Related U.S. Application Data

[63] Continuation-in-part of Ser. No. 9,843, Jan. 27, 1993, abandoned.

[51] Int. Cl.$^6$ .............................................. F16L 59/14
[52] U.S. Cl. .................................... 138/149; 138/147
[58] Field of Search ............... 137/375; 138/113, 114, 138/147, 148, 149; 220/445; 428/223

[56] References Cited

U.S. PATENT DOCUMENTS

| | | | |
|---|---|---|---|
| Re. 28,930 | 8/1976 | Johnson | 138/158 |
| 208,264 | 9/1878 | Peirce . | |
| 218,340 | 8/1879 | Toope . | |
| 230,059 | 7/1880 | Riley . | |
| 1,153,159 | 9/1915 | Gray . | |
| 1,613,725 | 1/1927 | Sabin | 138/148 |
| 2,075,180 | 3/1937 | Curtis | 220/445 |
| 2,119,438 | 5/1938 | O Leary | 220/445 |
| 2,254,964 | 9/1941 | Kettlewell | 138/149 |
| 2,707,493 | 5/1955 | Bonvillian et al. | 138/113 |
| 2,980,568 | 4/1961 | Kazmierowicz | 154/44 |
| 3,000,433 | 9/1961 | Kemper | 154/28 |
| 3,147,832 | 9/1964 | Saro | 138/147 |
| 3,528,456 | 9/1970 | Scheffler | 138/113 |
| 3,820,947 | 6/1974 | Boto et al. | 432/234 |
| 3,889,715 | 6/1975 | Lilja et al. | 138/117 |
| 3,980,262 | 9/1976 | Lee | 248/65 |
| 4,003,407 | 1/1977 | Finger | 138/103 |
| 4,009,735 | 3/1977 | Pinsky | 138/147 |
| 4,014,369 | 3/1977 | Kobres, Jr. | 138/112 |
| 4,061,162 | 12/1977 | Jones et al. | 138/147 |
| 4,146,203 | 3/1979 | Williams | 248/62 |
| 4,158,938 | 6/1979 | Meechan et al. | 52/463 |
| 4,233,816 | 11/1980 | Hensley | 62/55 |
| 4,287,245 | 9/1981 | Kikuchi | 428/36 |
| 4,300,323 | 11/1981 | Meechan et al. | 52/464 |
| 4,323,088 | 4/1982 | McClellan | 138/106 |
| 4,393,569 | 7/1983 | Byrd, Jr. | 29/460 |
| 4,436,119 | 3/1984 | Shahan et al. | 138/149 |
| 4,590,971 | 5/1986 | Webster et al. | 138/149 |
| 4,732,177 | 3/1988 | Maus et al. | 138/147 |
| 4,852,831 | 8/1989 | Sandstrom | 248/58 |
| 4,925,622 | 5/1990 | Gray, III et al. | 376/289 |
| 5,056,564 | 10/1991 | Roth | 138/149 |
| 5,104,700 | 4/1992 | Peterson | 428/223 |

FOREIGN PATENT DOCUMENTS

| | | | |
|---|---|---|---|
| 0830275 | 7/1949 | Germany . | |
| 2658741 | 6/1978 | Germany . | |
| 3104908 | 2/1981 | Germany . | |
| 3104908 | 9/1982 | Germany | 138/148 |
| 349847 | 10/1960 | Switzerland | 138/149 |
| 29643 | 12/1904 | United Kingdom . | |
| 0001271 | 1/1905 | United Kingdom . | |
| 1422156 | 1/1976 | United Kingdom . | |

Primary Examiner—David A. Scherbel
Assistant Examiner—Terrence R. Till
Attorney, Agent, or Firm—Louis T. Isaf; James A. Witherspoon

[57] ABSTRACT

Provided in an insulated assembly including a component covered by a reusable, reinforced insulation blanket, and jacketing covering the insulation blanket. The reinforced insulation blanket includes a plurality of jacket support assemblies that are securely attached to an insulation blanket. The jacket support assemblies support the jacketing so that the insulation blanket is not crushed when weight or other loads are applied to the jacketing. A jacket support assembly includes a component engaging plate disposed between the insulation blanket and the component to be insulated, a jacket engaging plate disposed between the insulation blanket and the jacketing, and a support stud. The support stud passes through the insulation blanket and rigidly connects the component engaging plate to the jacket engaging plate such that the jacket support assembly is securely attached to the insulation blanket. The jacket support assemblies are strategically placed to protect the insulation blanket. The insulation blanket is preferably flexible and the jacket support assemblies are preferably arranged spatially separate from one another in a manner that maintains the generally flexible nature of the insulation blanket.

17 Claims, 3 Drawing Sheets

REINFORCED INSULATION BLANKET

CROSS-REFERENCE TO RELATED APPLICATION

This application is a continuation-in-part of application Ser. No. 08/009,843, filed Jan. 27, 1993, now abandoned.

BACKGROUND OF THE INVENTION

The present invention relates generally to the field of industrial insulation, and, in its most preferred embodiments, to the field of preventing damage to the insulation on industrial equipment.

It is well known that many industrial equipment systems require effective insulation and serve as walkways or platforms for personnel. In the past, high compressive strength insulation, such as that composed of calcium silicate, and conventional low compressive strength insulation covered by metal jacketing have been utilized to help reduce insulation damage resulting from external loads such as, for example, foot traffic. However, it is often the case with both high compressive strength insulation and conventional low compressive strength insulation covered by metal jacketing that, in response to continuous, long term foot traffic, the insulation is nevertheless damaged, becoming compressed and/or fractured, thus failing as an effective insulator.

There is a need, therefore, for a system for supporting equipment system jacketing which solves these and other related, and unrelated, problems. There is also a need for a system for supporting jacketing on equipment other than piping.

SUMMARY OF THE INVENTION

Briefly described, the present invention, in its most preferred embodiments, includes an insulated system with supported jacketing. In accordance with the most preferred embodiments of the present invention, the insulated system with supported jacketing is referred to as an insulated component assembly and includes a component to be insulated, such as, for example and not limitation, a piping component or equipment body. The insulated component assembly further includes a reinforced insulation blanket covering the component to be insulated and jacketing covering the reinforced insulation blanket. In accordance with the preferred embodiments of the present invention, the reinforced insulation blanket and jacketing are capable of being removed from the piping component or equipment body and the reinforced insulation blanket reused. The reinforced insulation blanket preferably comprises jacket support assemblies that are securely attached to an insulation blanket. The jacket support assemblies support the jacketing so that the insulation blanket is not crushed when a walking load or other external loads are applied to the jacketing.

In accordance with the preferred embodiments of the present invention, a jacket support assembly includes a component engaging plate disposed between the insulation blanket and the insulated component, a jacket engaging plate disposed between the insulation blanket and the jacketing, and a support stud. The support stud passes through the insulation blanket and rigidly connects the component engaging plate to the jacket engaging plate such that the jacket support assembly is securely attached to the insulation blanket and a portion of the insulation blanket is disposed between the component engaging plate and the jacket engaging plate.

In accordance with the preferred embodiments of the present invention, a reusable insulation blanket is utilized. Due to the secure attachment between the insulation blanket and the jacket support assemblies, the jacket support assemblies essentially become a part of the reusable insulation blanket. Thus, the reinforced insulation blanket functions such that it is capable of being quickly applied to, removed from, and reapplied to a component that is to be insulated. In accordance with the preferred embodiments of the present invention a flexible insulation blanket is employed, and while the jacket support assemblies are rigid, the jacket support assemblies are spatially separate from one another. Thus, in accordance with the preferred embodiments of the present invention, the reinforced insulation blanket is generally flexible such that it can be manipulated in a manner similar to that in which the insulation blanket could be manipulated prior to the attachment of jacket support assemblies thereto. The fact that the reinforced insulation blanket is flexible allows a standard reinforced insulation blanket to accommodate the shape of a variety of variously shaped piping components or equipment bodies.

In various embodiments of the present invention, the jacket engaging plate and component engaging plate define various shapes so as to facilitate secure engagement with, respectively, variously shaped jackets and variously shaped insulated components. By way of example, and not limitation, in accordance with a first preferred embodiment of the present invention, engagement plates are curved to facilitate employment of a reinforced insulation blanket on a cylindrical piping component; in accordance with a second preferred embodiment of the present invention, engagement plates are planar to facilitate employment of a reinforced insulation blanket on a planar equipment body; and in accordance with a third preferred embodiment of the present invention, a component engaging plate is multi-planer to facilitate employment of a reinforced insulation blanket on a multi-planer equipment body. Alternate embodiments of the present invention include other variously shaped engaging plates that function to facilitate employment of a reinforced insulation blanket on other variously shaped equipment bodies. In accordance with the preferred embodiments of the present invention, a plurality of jacket support assemblies are attached to, and variously oriented on, insulation blankets so that the resulting reinforced insulation blankets will not be damaged when placed upon variously shaped components and exposed to variously applied weights or other loads. The present invention is additionally described in application Ser. No. 08/009,843, which is expressly incorporated herein, in its entirety, by reference.

It is, therefore, an object of the present invention to provide an insulation assembly with supported jacketing which protects an insulation layer from external forces which would otherwise damage the insulation layer.

Another object of the present invention is to provide an insulation assembly with supported jacketing which protects the insulation layer from external loads by transferring the load through a jacket support assembly to the pipe to bypass the insulation.

Yet another object of the present invention is to provide a reusable insulation blanket that supports jacketing.

Still another object of the present invention is to provide a jacket support assembly for attachment to a reusable insulation blanket.

Still another object of the present invention is to prolong the useful life of insulation blankets.

Still another object of the present invention is to provide a flexible reinforced insulation blanket.

Still another object of the present invention is provide a method and apparatus for easily transforming an insulation blanket into a reinforced insulation blanket.

Still another object of the present invention is to provide a reinforced insulation blanket that is capable of being quickly applied to and removed from the component being insulated.

Other objects, features and advantages of the present invention will become apparent upon reading and understanding this specification, taken in conjunction with the accompanying drawings.

DETAILED DESCRIPTION OF THE PREFERRED EMBODIMENT

Figure 1:
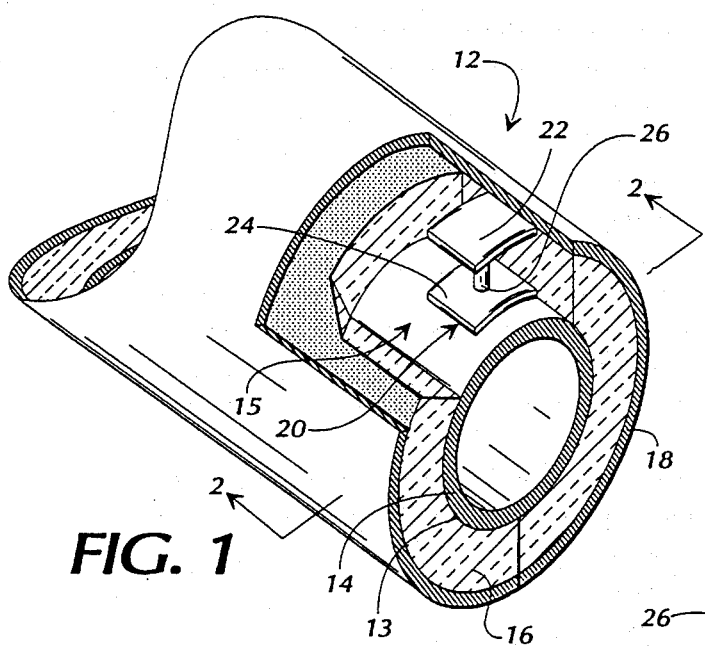
FIG. 1 is a perspective view of a cut-away portion of an insulated component assembly, in accordance with the first preferred embodiment of present invention.

Referring now in greater detail to the drawings, in which like numerals represent like components throughout the several views, a cut-away portion of an insulated component assembly 12 is depicted in FIG. 1. FIG. 1 is a perspective view of the cut-away portion of the insulated component assembly 12 in accordance with the preferred embodiment of the present invention. In accordance with the first preferred embodiment of the present invention, the insulated component assembly 12 includes an insulated component 13, a reinforced insulation blanket 15 covering the insulated component 13, and jacketing 18 covering the reinforced insulation blanket 15. In accordance with the first preferred embodiment of the present invention, the insulated component 13 is a piping component 14. The reinforced insulation blanket 15 preferably includes an insulation blanket 16 to which a plurality of jacket support assemblies 20 (only one of which is shown) are attached. In accordance with the first preferred embodiment, the jacket support assemblies 20 are disposed between the piping component 14 and the jacketing 18. The jacket support assemblies 20 preferably include a jacket engaging plate 22, a component engaging plate 24, and a support stud 26 disposed between and connecting the jacket engaging plate 22 and the component engaging plate 24. The support stud 26 preferably extends through the insulation blanket 16.

As discussed in greater detail below, while this specification refers to specific types of insulated components 13, it is to be understood that a wide variety of insulated component 13 are within the scope of the present invention. For example, and not limitation, insulated components 13 could be any type of equipment body including a piping component 14, vessels, pumps, valves, any of the insulated components 13 discussed below with reference to the second and third embodiments of the present invention, or combinations thereof.

Figure 2:
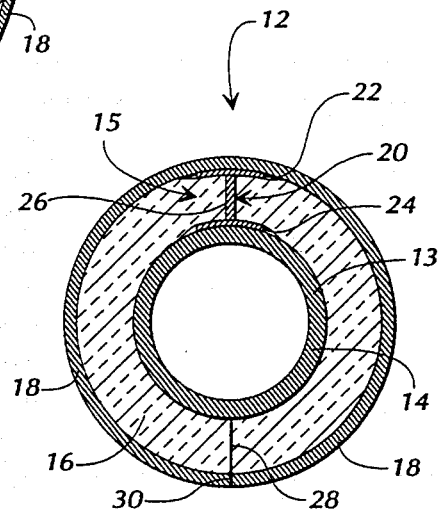
FIG. 2 is a front end, cross-sectional view of an insulated component assembly, in accordance with the first preferred embodiment of the present invention, from the perspective indicated by line 2—2 of FIG. 1.

Referring to FIG. 2, which is a front end, cross-sectional view of the insulated component assembly 12 from the perspective indicated by line 2—2 of FIG. 1, in accordance with the preferred embodiments of the present invention, the support stud 26 pierces the insulation blanket 16, the component engaging plate 24 is disposed between the insulation blanket 16 and the insulated component 13, and the jacket engaging plate 22 is disposed between the insulation blanket 16 and the jacketing 18. In accordance with the first preferred embodiment, the reinforced insulation blanket 15 and jacketing 18 include an insulation blanket seam 28 and a jacket seam 30, respectively, that allow for removal and reinstallation of the reinforced insulation blanket 15 and jacketing 18, as discussed below.

Figure 3:
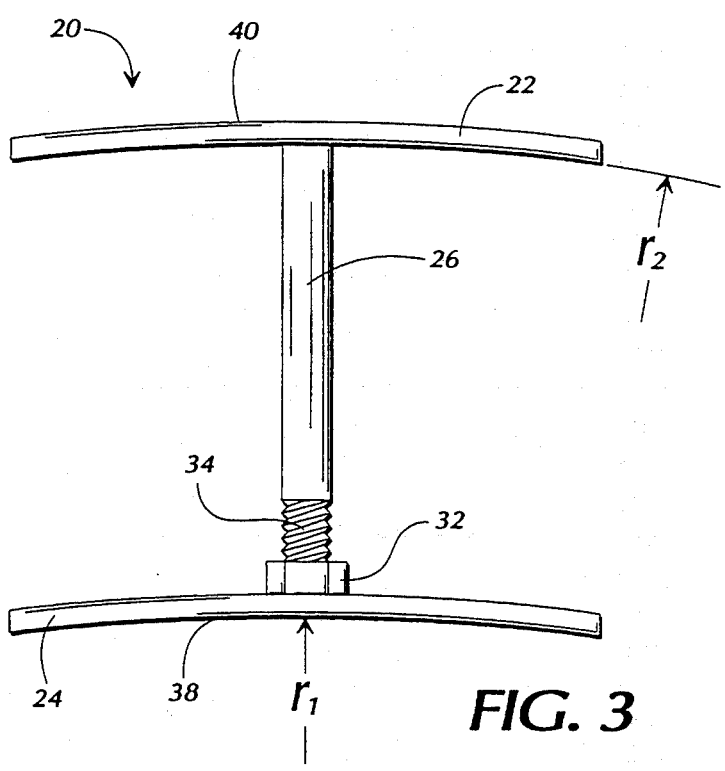
FIG. 3 is an isolated front view of a jacket support assembly that is part of the insulated component assembly of the first preferred embodiment of the present invention.

Referring to FIG. 3, which is an isolated front end view of the jacket support assembly of FIGS. 1 and 2, in accordance with the preferred embodiments of the present invention, the jacket support assembly 20 further includes a nut 32 that is rigidly attached to the component engaging plate 24. The support stud 26 is rigidly connected to the jacket engaging plate 22 at one end and includes threads 34 at the other end. The threads 34 are threadedly engaged to the nut 32. In an alternate embodiment of the present invention, both the jacket engaging plate 22 and component engaging plate 24 are connected to the support stud 26 by a nut and threads. Referring further to FIG. 3, in accordance with the first preferred embodiment of the present invention, the component engaging plate 24 and jacket engaging plate 22 define a component engaging surface 38 and a jacket engaging surface 40, respectively. The component engaging plate 24, or more specifically the component engaging surface 38 thereof, defines a shape that is complimentary to the insulated component 13 (i.e., the piping component 14 in the first preferred embodiment) so as to facilitate secure engagement therebetween. Similarly, the jacket engaging plate 22, or more specifically the jacket engaging surface 40, defines a shape that is complementary to the jacketing 18 so as to facilitate secure engagement therebetween. More particularly, in accordance with the first preferred embodiment of the present invention, the component engaging plate 24 defines a radius of curvature "r1" that corresponds to the radius of curvature of the outer surface of the piping component 14 (FIGS. 1 and 2) and the jacket engaging plate 22 defines a radius of curvature "r2" that corresponds to the radius of curvature of the inner surface of the jacketing 18 (FIGS. 1 and 2).

Figure 4:
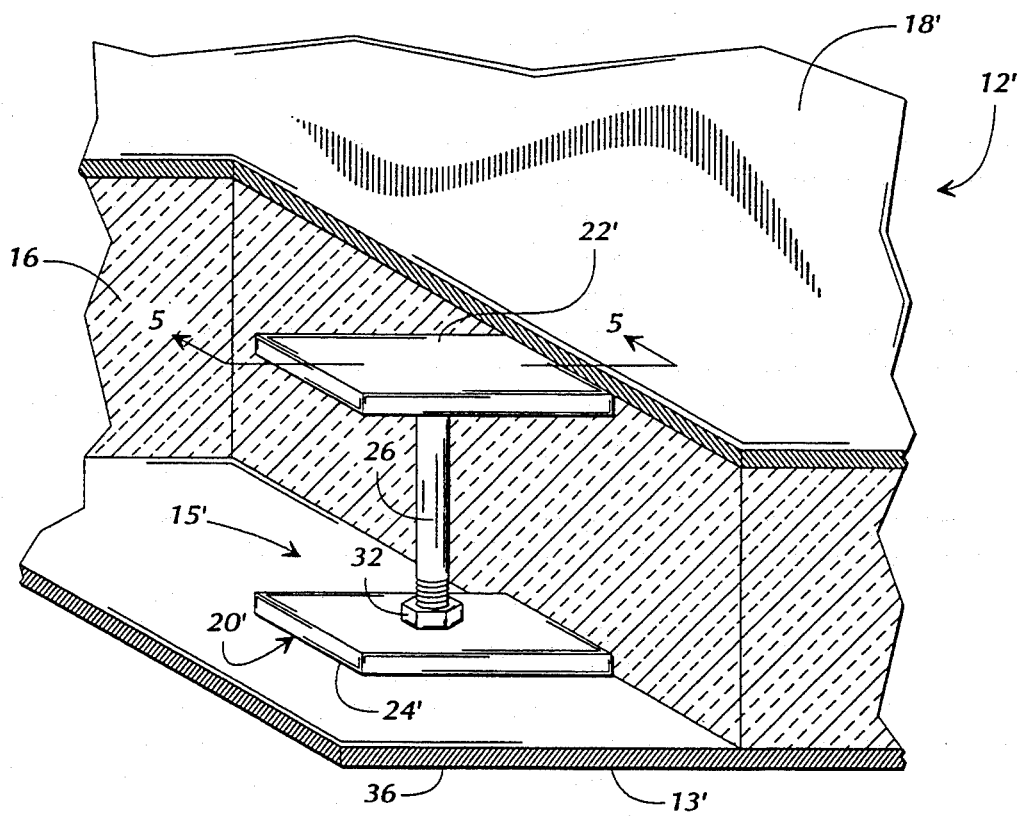
FIG. 4 is a perspective view of a cut-away portion of an insulated component assembly, in accordance with a second preferred embodiment of present invention.
Figure 5:
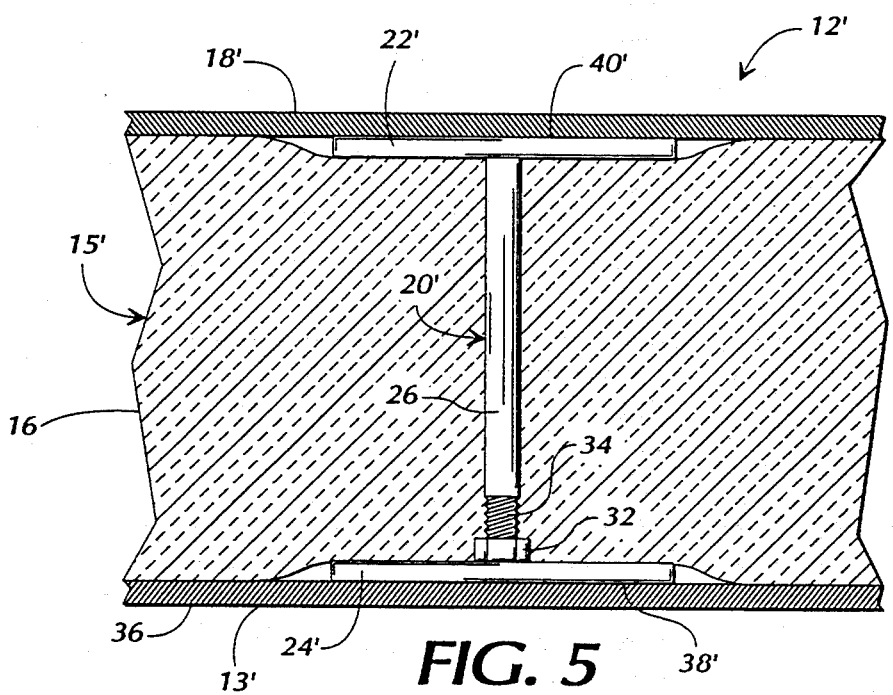
FIG. 5 is a front, partially cross-sectional view of an insulated component assembly, in accordance with the second preferred embodiment of the present invention, from the perspective indicated by line 5—5 of FIG. 4.

FIG. 4 is a perspective view of a cut-away portion of an insulated component assembly 12', in accordance with a second preferred embodiment of present invention. In accordance with the second preferred embodiment of the present invention, the insulated component assembly 12' includes an insulated component 13', a reinforced insulation blanket 15' covering the insulated component 13', and jacketing 18' covering the reinforced insulation blanket 15'. In accordance with the second preferred embodiment of the present invention, at least a portion of the insulated component 13' is a planar equipment body 36, and at least a portion of the jacketing 18' is also planar, and such a planar equipment body 36 and a planar portion of jacketing 18' are shown in FIG. 4. The reinforced insulation blanket 15' of the second preferred embodiment includes an insulation blanket 16 to which a plurality of jacket support assemblies 20' (only one of which is shown) are attached. The configuration and placement of the jacket support assemblies 20' of the second preferred embodiment are similar to the configuration and placement of the jacket support assemblies 20 (FIGS. 1-3) of the first preferred embodiment, with the exception that the jacket engaging plate 22' and component engaging plate 24' of the second preferred embodiment are planer to facilitate secure engagement to the jacketing 18' and planar equipment body 36, respectively. FIG. 5 is a front cross-sectional view of the insulated component assembly 12' from the perspective indicated by line 5—5 of FIG. 4, in accordance with the second preferred embodiment of the present invention, wherein the jacket support assembly 20' is not cross-sectioned in an effort to clarify the view. FIG. 5 clearly shows that, in accordance with the second preferred embodiment of the present invention, the insulation blanket 16 is sandwiched between the jacket engaging plate 22' and the component engaging plate 24'.

Figure 6:
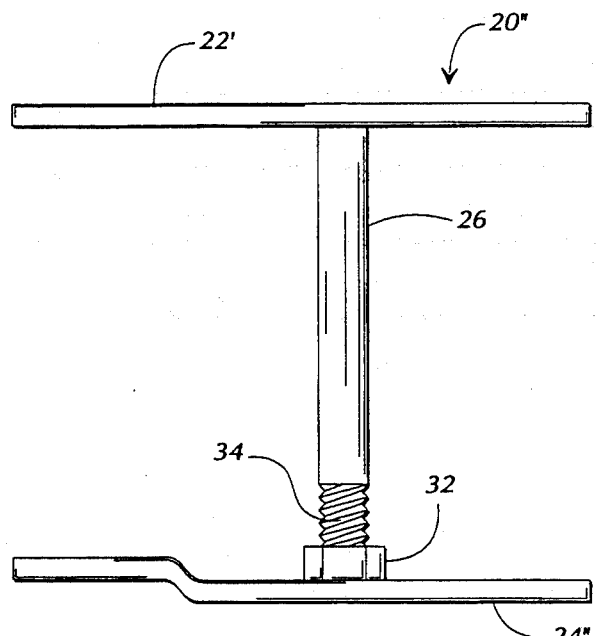
FIG. 6 is a front view of a jacket support assembly in accordance with a third preferred embodiment of the present invention.

FIG. 6 is a front view of a jacket support assembly 20" in accordance with a third preferred embodiment of the present invention. In accordance with the third preferred embodiment, the jacket support assembly 20" is identical to the jacket support assembly 20' (FIGS. 4 and 5) of the second preferred embodiment except that the component engaging plate 24" of the third preferred embodiment is multi-planar and thereby functions to facilitate secure engagement of the reinforced insulation blanket associated therewith to a multi-planar equipment body (not shown). Referring to FIGS. 1-3, in accordance with various alternate embodiments of the present invention, the jacket engaging plate 22 and component engaging plate 24 define various shapes so as to facilitate secure engagement of a reinforced insulation blanket 15 with jacketing 18 and insulated components 13 that are variously shaped.

Referring back to FIG. 1 for example, a jacket support assembly 20 is acceptably assembled, in accordance with the preferred embodiments of the present invention, by the method which follows. A insulation blanket 16 that is preferably flexible, reusable and suitable for industrial usage is obtained. An acceptable example of such an insulation blanket 16 is disclosed in U.S. Pat. No. 4,009,735, which is expressly incorporated herein, in its entirety, by reference. Jacket support assemblies 20 are then fabricated and attached to the insulation blanket 16 to form a reinforced insulation blanket 15. Referring additionally to FIG. 3 for example, in accordance with the preferred embodiments of the present invention, a support stud 26 that is about as long as the insulation blanket 16 is thick is selected. The support stud 16 preferably defines threads 34 at one end. A jacket engaging plate 22 is obtained and preferably shaped to complement the jacketing 18 that it will be engaging. The end of the support stud 26 that is not threaded 34 is attached, for example by welding, proximate to the center of the side of the jacket engaging plate 22 that is to engage the insulation blanket 16. The support stud 26 is preferably attached such that it extends generally perpendicularly from the jacket engaging plate 22. The end of the support stud 26 with threads 34 is then pierced completely through the insulation blanket 16 at a specific location, as will be discussed below. Then, a component engaging plate 24 is obtained and shaped to complement the piping component 14 that it will be engaging. A nut 32 is rigidly attached to roughly the center of the component engaging plate 24, for example by welding, and the nut 32 is threadedly attached to the threads 34 of the support stud 26 that is protruding through the insulation blanket 16. In accordance with alternate embodiments of the present invention, a nut 32 and thread 34 arrangement is used to attach the jacket engaging plate 22 to the support stud 26.

The above process is repeated until a sufficient number of jacket support assemblies 20 are attached to, and appropriately oriented on, the insulation blanket 16 so that the resulting reinforced insulation blanket 15 will not be damaged when the jacketing 18 associated therewith is exposed to weight or other loads. Once the reinforced insulation blanket 15 is formed, the reinforced insulation blanket 15 is applied to the insulated component 13 so that the support assemblies 20 are properly oriented to protect the insulation blanket 16 from weight or other loads. As discussed previously, in accordance with the preferred embodiments of the present invention, a flexible insulation blanket 16 is employed, and while the jacket support assemblies 20 are rigid, the jacket support assemblies 20 are arranged spatially separate from one another such that the reinforced insulation blanket 15 retains at least some, if not most, of the flexibility of the insulation blanket 16. Thus, in accordance with the preferred embodiments of the present invention, the reinforced insulation blanket 15 functions, in part due to the generally flexible nature thereof, such that it is capable of being applied to an insulated component 13 (i.e., the component to be insulated) to which it would be difficult, for example due to access constraints, to apply a rigid insulation blanket (not shown). In accordance with the preferred embodiments of the present invention, after the reinforced insulation blanket 15 is installed upon the insulated component 13, the jacketing 18 is applied over the reinforced insulation blanket 15 in substantially the same manner that jacketing 18 is applied over a conventional insulation blanket.

Figure 7:
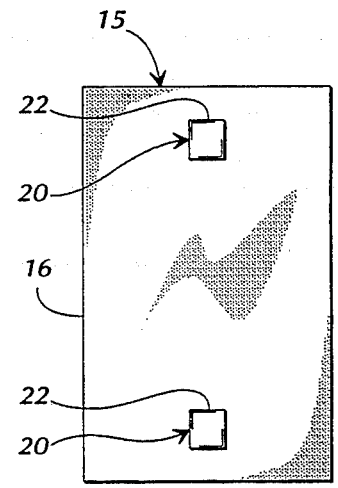
FIG. 7 is top isolated view of a reinforced insulation blanket in a flattened configuration, wherein the reinforced insulation blanket is part of the insulated component assembly of the first preferred embodiment of the present invention.
Figure 8:
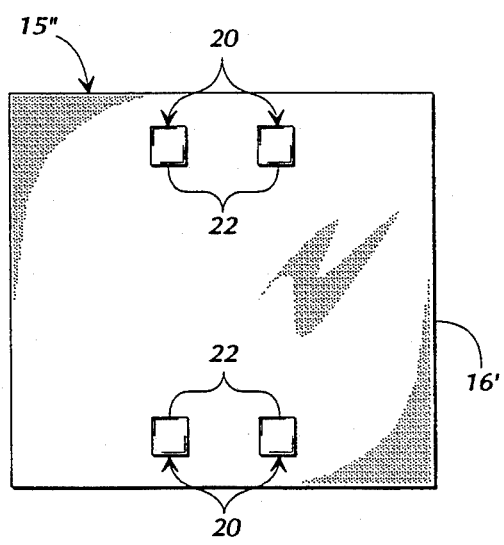
FIG. 8 is top isolated view of a reinforced insulation blanket in a flattened configuration, in accordance with a first alternate embodiment of the present invention.
Figure 9:
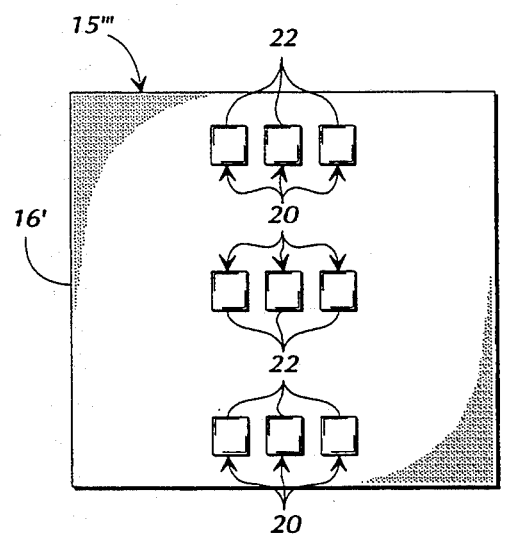
FIG. 9 is top isolated view of a reinforced insulation blanket in a flattened configuration, in accordance with a second alternate embodiment of the present invention.

In accordance with the preferred embodiments of the present invention, the arrangement of jacket support assemblies 20 in the reinforced insulation blanket 15 will vary depending, for example, upon the configuration of the insulated component 13 upon which the reinforced insulation blanket 15 is to be applied and the anticipated external load on the associated jacketing 18. For example, and not limitation, FIG. 7 is top isolated view of the reinforced insulation blanket 15 of the first preferred embodiment of the present invention (FIGS. 1–3) in a flattened configuration. As shown, the reinforced insulation blanket 15 of the first preferred embodiment includes a plurality of jacket support assemblies 20. In FIG. 7 jacket engaging plates 22 are seen while the rest of the jacket support assembly 20 is not seen. Referring additionally to FIGS. 1–3, a bottom isolated view of the reinforced insulation blanket 15 in a flattened configuration would appear as the mirror image of FIG. 7, except that the component engaging plates 24 would be seen in place of the jacket engaging plates 22. FIG. 7 shows an example of how a reinforced insulation blanket 15 that is to be employed on a small diameter, horizontally extending piping component 14 having a walking load on the top thereof might acceptably be configured. An insulated component assembly 12 including such a small diameter, horizontally extending piping component 14 and the reinforced insulation blanket 15 of FIG. 7 would preferably be configured as shown in FIGS. 1 and 2, with the jacket support assembles 20 extending along the top of the piping component 14, and a single piece of jacketing 18 would preferably extend over and between the two jacket engaging plates 22. Also for example, FIG. 8 is a top isolated view of a reinforced insulation blanket 15" in a flattened configuration, in accordance with a first alternate embodiment of the present invention. FIG. 8 shows how a reinforced insulation blanket 15 that is to be employed on a larger diameter, horizontally extending piping component 14 exposed to loading on the top thereof might acceptably be configured, wherein the jacket support assemblies 20 would extend generally along the top of the piping component 14. As an additional example, FIG. 9 is a top isolated view of a reinforced insulation blanket 15''' in a flattened configuration, in accordance with a second alternate embodiment of the present invention. FIG. 9 shows a reinforced insulation blanket 15''' that might acceptably be used in the place of the reinforced insulation blanket 15" of FIG. 8 to handle increased loading. Referring still to FIGS. 1–3 for example, as mentioned above, the required placement of jacket support assemblies 20 varies depending on the shape of the insulated component 13 and jacketing 18, the thickness and strength of the jacketing 18, and the magnitude and location of the weight or load being placed upon the jacketing 18. Alternate embodiments of the present invention include various arrangements and placements of the jacket support assemblies 20.

In accordance with the preferred embodiments of the present invention, once an insulation blanket 16 is placed upon an insulated component 13, it can subsequently be removed and reapplied. It is generally not necessary to specifically deal with the jacket support assemblies 20 when removing or reapplying the insulation blanket. As discussed above, the support stud 26 pierces the insulation blanket 16 and the jacket engaging plate 22 and component engaging plate 24 sandwich the insulation blanket 16. Therefore, the plurality of jacket support assemblies 20 are securely attached to the insulation blanket 16 and essentially become a part of the insulation blanket 16. Thus, the jacket support assemblies 20 are removed from the insulated component assembly 12 when the reinforced insulation blanket 15 is removed from the insulated component assembly 12, and are installed when the reinforced insulation blanket 15 is installed.

Referring to FIGS. 1, 2, 4, and 5, in accordance with the preferred embodiments of the present invention, the insulated components 13,13' and jacketing 18, 18' are conventional, as would be understood by one reasonably skilled in the art. As mentioned above, a suitable insulation blanket 16 is disclosed in U.S. Pat. No. 4,009,735. In accordance with the preferred embodiments of the present invention, an acceptable example of a jacket engaging plate 22 and component engaging plate 24 is a two inch by two inch square piece of sixteen gauge, 300 series stainless steel, and an acceptable example of a support stud 26 is a $\frac{1}{4}$ inch. diameter, 300 series, stainless steel stud. In accordance with alternate embodiments of the present invention, the plates 22,24 define various sizes and shapes, such as, for example and not limitation, a rounded shape. Additionally, in accordance with other alternate embodiments, the support studs 26 are variously shaped and sized.

Whereas this invention has been described in detail with particular reference to preferred and alternate embodiments, it should be understood that variations and modifications can be effected within the spirit and scope of the invention, as described herein before and as defined in the appended claims.

I claim:

1. A reinforced insulation blanket for insulating an industrial component and supporting jacketing relative to the industrial component, the insulation assembly comprising:
    a flexible insulation blanket including, at least, a top surface and a bottom surface; and
    a plurality of support assemblies connected to said flexible insulation blanket,
        wherein each support assembly of said plurality of support assemblies includes, at least,
            an upper plate exterior to said flexible insulation blanket and proximate to said top surface of said flexible insulation blanket for abutting said jacketing,
            a lower plate exterior to said flexible insulation blanket and proximate to said bottom surface of said flexible insulation blanket for abutting the industrial component, wherein a separation distance is defined between said upper plate and said lower plate, and wherein said flexible insulation blanket is sandwiched between said upper plate and said lower plate, and
            a support member pierced through said flexible insulation blanket, wherein said support member connects said upper plate to said lower plate and maintains said separation distance between said upper plate and said lower plate, and
        wherein said plurality of support assemblies are arranged spatially separate from one another such that the reinforced insulation blanket is flexible.

2. The reinforced insulation blanket of claim 1, wherein said support member includes, at least, a support stud disposed between and connected to said upper plate and said lower plate.

3. The reinforced insulation blanket of claim 2, wherein, said upper plate abuts said top surface of said flexible insulation blanket, and said lower plate abuts said bottom surface of said flexible insulation blanket.

4. The reinforced insulation blanket of claim 2,
wherein said upper plate is generally planar, and
wherein said lower plate is generally planar.

5. The reinforced insulation blanket of claim 2, wherein said support assemblies are rigid.

6. The reinforced insulation blanket of claim 2,
wherein said upper plate and said lower plate each include, at least, a two inch by two inch square piece of sixteen gauge steel, and
wherein said support stud is a stud with a $\frac{1}{4}$th inch diameter.

7. The reinforced insulation blanket of claim 2, wherein said plurality of support assemblies are movably connected to each other by said flexible insulation blanket.

8. The reinforced insulation blanket of claim 7, wherein the reinforced insulation blanket is unitary, substantially flexible, and readily removable from and replaceable upon the industrial component while maintaining said unitary characteristic.

9. The reinforced insulation blanket of claim 8, wherein the reinforced insulation blanket is capable of achieving a broad, flattened configuration.

10. The reinforced insulation blanket of claim 7,
wherein said upper plate defines, at least,
an upper surface for abutting the jacket, wherein said upper surface is generally planar to complement the surface of the jacket, and
a lower surface opposite from said upper surface of said upper plate, wherein said lower surface of said upper plate abuts said top surface of said flexible insulation blanket, and
wherein said lower plate defines, at least,
a lower surface for abutting the industrial component, wherein said lower surface of said lower plate is generally planar to complement the surface of the industrial component, and
an upper surface opposite from said lower surface of said lower plate, wherein said upper surface of said lower plate abuts said bottom surface of said flexible insulation blanket.

11. The reinforced insulation blanket of claim 10,
wherein said support stud includes, at least, a first end and an opposite second end,
wherein said first end of said support stud is connected to said lower surface of said upper plate, and
wherein said second end of said support stud is connected to said upper surface of said lower plate.

12. The reinforced insulation blanket of claim 11,
wherein said lower surface of said upper plate is substantially planar to complement said top surface of said flexible insulation blanket, and
wherein said upper surface of said lower plate is substantially planar to complement said bottom surface of said flexible insulation blanket.

13. The reinforced insulation blanket of claim 12,
wherein said first end of said support stud is connected to said lower surface of said upper plate proximate to the center of said lower surface of said upper plate, and
wherein said second end of said support stud is connected to said upper surface of said lower plate proximate to the center of said upper surface of said lower plate.

14. In combination:
a flexible insulation blanket including, at least, a blanket top surface and a blanket bottom surface; and
a plurality of support assemblies connected to said flexible insulation blanket,
wherein each support assembly of said plurality of support assemblies includes, at least,
a support stud pierced at least substantially through said flexible insulation blanket and including, at least, a first end proximate to said blanket top surface, and an opposite second end proximate to said blanket bottom surface,
an upper plate proximate to said blanket top surface and connected to said first end of said support stud,
a lower plate proximate to said blanket bottom surface and connected to said second end of said support stud,
wherein a separation distance is defined between said upper plate and said lower plate and said support stud maintains said separation distance
wherein said plurality of support assemblies are arranged spatially separate from one another such that the combination is flexible.

15. The combination of claim 14, wherein said upper plate and said lower plate are exterior to said flexible insulation blanket.

16. The combination of claim 15,
wherein said upper plate defines, at least,
a lower surface contacting said blanket top surface, and
an upper surface opposite from said lower surface of said upper plate, and
wherein said lower plate defines, at least,
an upper surface contacting said blanket bottom surface, and
a lower surface opposite from said upper surface of said lower plate.

17. The combination of claim 16,
wherein each support assembly of said plurality of support assemblies defines, at least, a support assembly top and a support assembly bottom, and
wherein for each support assembly of said plurality of support assemblies,
said upper surface of said upper plate is generally broad and planar and defines said support assembly top, and
said lower surface of said lower plate is generally broad and planar and defines said support assembly bottom.

* * * * *